(12) United States Patent
Subramanian et al.

(10) Patent No.: US 10,007,701 B2
(45) Date of Patent: Jun. 26, 2018

(54) DATABASE CONSOLIDATION ADVISOR (71) Applicant: ORACLE INTERNATIONAL CORPORATION, Redwood Shores, CA (US)

(72) Inventors: Mahesh Subramanian, Bangalore (IN); Andrew Bodge, Acton, MA (US); Ravi Pattabhi, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 355 days.

(21) Appl. No.: 14/333,439

(22) Filed: Jul. 16, 2014

(65) Prior Publication Data

US 2016/0019265 A1  Jan. 21, 2016

(51) Int. Cl.
*G06F 17/30* (2006.01)
*G06F 9/50* (2006.01)

(52) U.S. Cl.
CPC ...... *G06F 17/30507* (2013.01); *G06F 9/5083* (2013.01); *G06F 17/30* (2013.01); *G06F 17/30864* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 7,616,583 B1 * | 11/2009 | Power | G06Q 10/06 370/252 |
| 8,606,894 B1 | 12/2013 | Fremont et al. | |
| 2007/0192406 A1 * | 8/2007 | Frietsch | G06F 1/3209 709/203 |
| 2010/0082505 A1 | 4/2010 | Hollingsworth et al. | |

* cited by examiner

*Primary Examiner* — Jau Shya Meng
(74) *Attorney, Agent, or Firm* — Hickman Palermo Becker Bingham LLP (57) ABSTRACT

Techniques are described for generating automated advice with respect to consolidating a plurality of sources. A set of one or more parameters relating to a proposed consolidation for a plurality of consolidation sources is received. In response to receiving the set of one or more parameters, a set of one or more recommendations for consolidating the plurality of consolidation sources is generated and stored on at least one of a volatile or non-volatile computer-readable storage medium. The set of one or more recommendations may indicate how to improve a performance associated with consolidating the plurality of sources to a set of one or more destinations based on a particular consolidation scenario. The set of one or more recommendations may be displayed during consolidation planning for the plurality of consolidation sources.

26 Claims, 7 Drawing Sheets

| Rule # | Input 402 | Logic 404 | System Action 406 |
|---|---|---|---|
| 412 | I/O Workload in MB/Sec, Workload in IOPS of source database | To estimate Workload Type, classify hourly workload as OLTP or DSS based on ratio of I/O MB/Sec to IOPS compared to threshold. If number of OLTP hours is between first threshold (e.g., 40%) and second threshold (e.g., 60%) classify result for the source database as Mixed; Else If < first threshold then DSS; Otherwise OLTP. | Display Estimated Workload Type of source database as OLTP/DSS/Mixed. |
| 414 | Average Active Sessions (AAS), core count of source database | Average(AAS) > Average(core count) => May be CPU bound. | Show warning: Detected potentially CPU-bound source databases. Consider tuning these databases to eliminate any CPU bottleneck prior to consolidation planning. Their current workload measurements may not be true indicators of their resource requirements. |
| 416 | Workload type estimated (OLTP/DSS/Mixed), Buffer Cache Hit Ratio of source database | If (Workload type estimated = OLTP) and Buffer Cache Hit Ratio < threshold | Show Warning: Buffer Cache Hit Ratio for this source database is {...}%. This may require tuning SQL and/or buffer cache to eliminate excessive I/O load prior to consolidation planning. |
| 418 | Workload type estimated (OLTP/DSS/Mixed), Average wait time for event 'log file sync' at the source database | If (Workload type estimated = OLTP) and Average wait time for 'log file sync' event > threshold time | Show Warning: Average wait time for 'log file sync' event for this source database is {...}ms. This indicates excessive time to write redo information to redo log files on disk possibly due to slow disks that store the online logs or un-batched commits. Recommend tuning SQL (commit frequency, use of NOLOGGING option), checking disk contention and enhancing disk throughput prior to consolidation planning. |
| 420 | Workload type estimated (OLTP/DSS/Mixed), Average wait time for event 'db file sequential read' at the source database | If (Workload type estimated = OLTP) and Average wait time for 'db file sequential read' event > threshold time | Show Warning: Average wait time for 'db file sequential read' for this source database is {...}ms. This may be indicative of poorly tuned SQL or slow I/O subsystem. Investigation of SQL statements performing many disk reads and the I/O subsystem for poor read time is recommended prior to consolidation planning. |

FIG. 4A

| Rule # | Input 402 | Logic 404 | System Action 406 |
|---|---|---|---|
| 422 | Workload type estimated, IOPS of source database | Check if (Workload type estimated=OLTP) and (IOPS > threshold) and (destination is not Exadata) | Show informational message to recommend Exadata: These source databases seem to be running OLTP workloads at high IOPS rates. They are likely to benefit from consolidating to an Oracle Exadata Database Machine (due to Flash Cache). |
| 424 | Workload type estimated (OLTP/DSS/Mixed) for all source databases | Check if ({Workload type estimated = Mixed for *any* source database } or {there a mix of OLTP and DSS type source databases }) and (destination is not Exadata) | Show informational message to recommend Exadata: Consolidation of databases running Mixed (OLTP and DSS) workloads is likely to benefit from the storage solution offered by Oracle Exadata Database Machines. |
| 426 | Workload type estimated (OLTP/DSS/Mixed), I/O Workload in MB/Sec, Average Synchronous Single-Block Read Latency value of source database. | If (Workload type estimated = DSS or Mixed) and (I/O Workload > threshold rate) and (Average Synchronous Single-Block Read Latency > threshold time) and (Workload type estimated = OLTP or Mixed for *any* source database) and (destination is not Exadata) | Recommend Exadata as Destination: These source databases seem to be running DSS or Mixed workload at high I/O rates. Also high single-block read latency was detected. Oracle Exadata Database Machine is recommended as the destination to consolidate these sources to prevent high DSS I/O rates from impacting OLTP performance. |
| 428 | Read IOPS ('Physical Read Per Sec metric' from AWR) and Write IOPS ('Physical Write Per Sec metric' from AWR) for the source database, Required ASM Redundancy at Destination Input by User (High/ Normal/None. None is not shown if destination selected is Exadata) | (Total) IOPS recommended for the source database at destination is computed as =Read IOPS + (4* Write IOPS if High, 2* Write IOPS if Normal, 1* Write IOPS if None) | Affects displayed IOPS recommendation. |
| 430 | Cluster Database Configuration Type of source db (Policy-Managed /Admin-Managed/Non-cluster) | If user opts to use this rule, system prevents policy-managed source RAC databases from mapping to the same destination as admin-managed or non-cluster databases. Also if manual mapping by user violates this constraint, flag the violation. | A mutually exclusive constraint option is provided to not mix policy-managed databases with admin-managed or non-cluster databases. |

FIG. 4B

| Rule # | Input 402 | Logic 404 | System Action 406 |
|---|---|---|---|
| 432 | User specified compression types for table segments (OLTP/Query High/Query Low/Archive High/Archive Low), index segments (Index High/Index Low) and LOB segments (LOB High/LOB Medium/LOB Low), the estimated compression ratios for the three segment types, uncompressed segment space (GB) for the three segment types, workload type estimated (OLTP/DSS/Mixed), destination type. | For each of the three segment types, find 1. The estimated current space saving for the user specified compression type (GB) = uncompressed segment size *(1-1/estimated compression ratio for user specified compression type). 2. The maximum estimated compression for the types of compression appropriate for the workload type (OLTP=>OLTP/Index High/Index Low/LOB High/LOB Medium/LOB Low; DSS=>OLTP/Query High/Query Low/Index High/Index Low/LOB High/LOB Medium/LOB Low; Mixed=> OLTP/Index High/Index Low/LOB High/LOB Medium/LOB Low); and destination type (Query High, Query Low, Archive High, Archive Low are HCC only applicable to Exadata, Sun ZFS Storage Appliance, Pillar Axiom, etc.). Estimated maximum space saving (GB) = max(uncompressed segment size*(1-1/compression ratio)). Is (estimated maximum space saving - estimated current space saving) > threshold? | Informational Message: By selecting {...} compression type for {...} segment type, storage space saving of {...} GB is estimated at the destination. |
| 434 | Total Storage Space (GB) required for all the mapped source databases, total IOPS required for all the mapped sources, total I/O bandwidth required for all the mapped sources, destination storage unit type, destination storage unit configuration, computed number of storage units required at destination. | If destination storage unit type is Exadata Storage Server, calculate the number of storage units required for the alternative disk configuration (High Performance or High Capacity). Is number of storage units for the alternative configuration < computed number of storage units? | Informational Message: To reduce the number of storage units needed at destination, consider selecting a storage unit configuration with High {Performance\|Capacity} disks. |

DATABASE CONSOLIDATION ADVISOR

FIELD OF THE DISCLOSURE

The present disclosure relates, generally, to consolidating computing resources and, more specifically, to techniques for generating advisory messages and other input for consolidation analysis.

BACKGROUND

Organizations often deploy multiple databases across a grid or datacenter to support various applications. Over time, an organization may upgrade or scale up a datacenter's servers, databases, and other underlying infrastructure to satisfy increased demands of the various applications or to support new applications. This growth may result in server sprawl, where excess servers are poorly utilized, difficult to manage, and consume valuable resources.

One approach system administrators use to mitigate server sprawl and to take advantage of upgraded infrastructure involves database consolidation. According to this approach, multiple databases are migrated to a fewer number of databases or database servers. Benefits of database consolidation may include, without limitation, minimizing wasted (idle) resources on servers, improving system manageability, reducing floor space and cooling demands in datacenters, and lessening the vulnerability of datacenters to security threats as a result of fewer actively deployed servers.

While there may be many benefits to database consolidation, the process can be complex and cumbersome. For example, the system administrator may have difficulty identifying destination databases or servers onto which multiple source databases can "fit". Adding to the complexity, there may be organization-specific constraints based on location of the databases, lifecycle status, redundancy for failover, load-balancing demands, etc. Manually evaluating each consolidation option may take a lot of time and expertise. Furthermore, many of the decisions during consolidation planning may be subjective and dependent on user-intuition. If the administrator makes a poor planning decision, then database consolidation could suffer from poor performance, possibly affecting more systems than before consolidation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which:

FIGS. 4A-4C are tables depicting example rule sets that may be evaluated to generate recommendations with respect to consolidating a plurality of sources, according to an embodiment.

DETAILED DESCRIPTION

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

Techniques are described herein for automatically and dynamically generating recommendations with respect to consolidating a plurality of sources. The recommendations may be generated and displayed during a consolidation planning phase and may generally comprise information that provides guidance or other recommendations for performing a consolidation operation. The recommendations may help a user determine an optimal consolidation scenario and avoid potential pitfalls that may occur during the consolidation process.

In some embodiments, recommendations may be generated based on a set of one or more parameters for a consolidation scenario. The set of one or more parameter values may be input (e.g., by a user) during the planning phase of a database consolidation to define constraints associated with a particular consolidation scenario. In response to receiving the set of one or more parameters, a consolidation planning system may determine a set of one or more recommendations that are appropriate for the consolidation scenario. Once generated, the set of recommendations may be stored on at least one of a volatile or non-volatile computer-readable storage medium. Many different consolidation scenarios may similarly be analyzed with a different set of recommendations generated for each respective consolidation scenario.

In some embodiments, recommendations may be generated based on workload characteristics associated with the sources. The workload characteristics may be determined from a set of metrics and/or other data that is captured from the sources. The workload characteristics of the sources may be analyzed to detect potential conflicts such as bottlenecks and determine projected post-consolidation performance for various consolidation scenarios involving the sources. Based on the analysis, recommendations to avoid potential conflicts and improve projected post-consolidation performance may be generated and stored.

In some embodiments, a rule-based engine is used to generate the recommendations. To determine which recommendations to generate, the rule-based engine may apply a set of one or more rules to a set of one or more proposed consolidation scenarios, to individual sources prior to defining or generating the consolidation scenarios, and/or to single sources and/or collections of sources when a consolidation scenario has been defined but before the consolidation scenario has been evaluated. The set of rules may analyze a variety of inputs to generate the recommendations. The results of the rule evaluations may be used during scenario evaluation to guide the allocation of consolidation sources to consolidation destinations. The implementation logic for the rules may be updated independently of the logic that derives the rule inputs, allowing for rule modularity and facilitating manageability. The set of rules that are applied may also be extensible and/or modifiable to capture custom-defined logic such as organization-specific constraints for a particular database consolidation operation.

Consolidation Advisory Framework

A framework is described herein for facilitating source consolidation. The framework may support a variety of tasks, including, without limitation:

- Measuring and/or otherwise determining workload characteristics associated with sources;
- Identifying potential conflicts and/or other issues that may impact post-consolidation performance;
- Predicting post-consolidation performance for various consolidation scenarios; and/or
- Generating suggested source-to-destination mappings and/or other recommendations for consolidating the plurality of sources.

Figure 1:
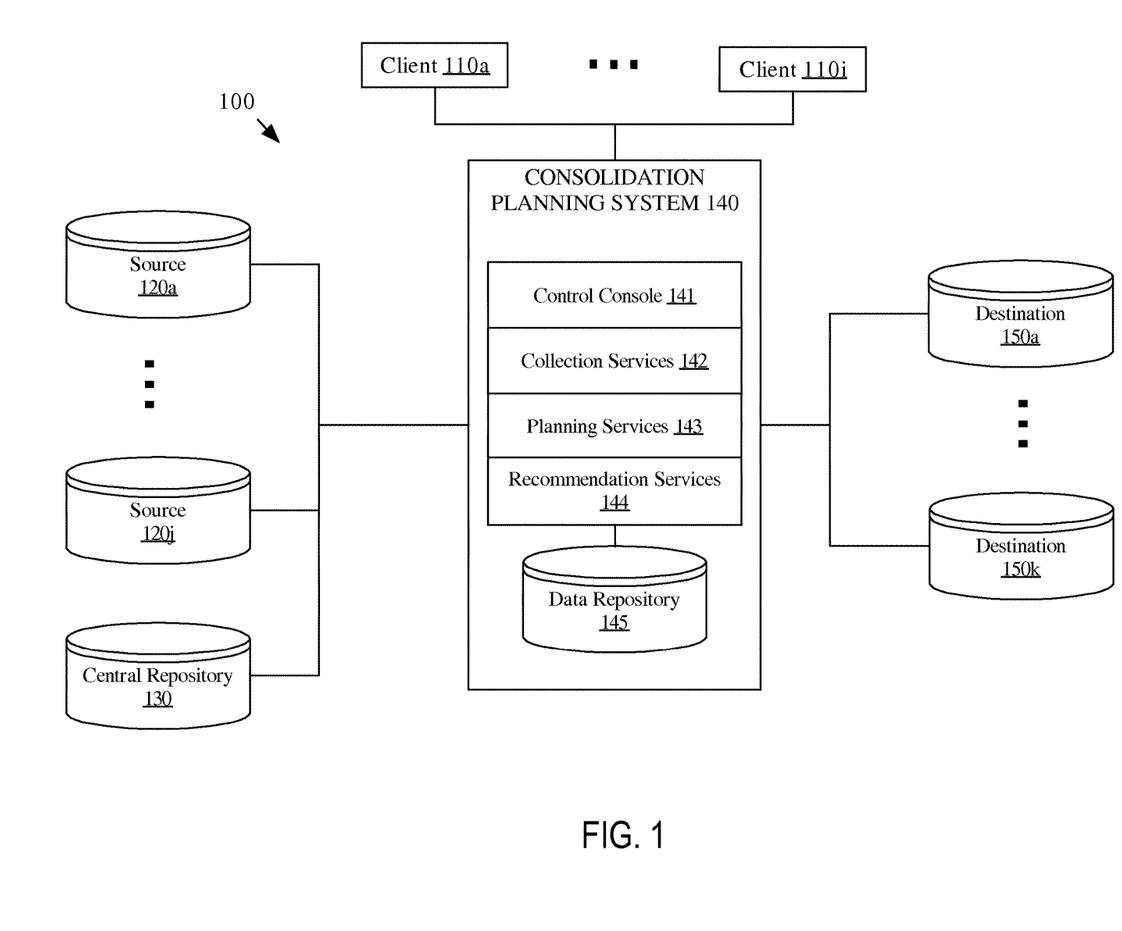
FIG. 1 is a block diagram depicting an example system for guiding source consolidation, according to an embodiment.

FIG. 1 is a block diagram depicting an example system for guiding source consolidation, according to an embodiment. System 100 generally comprises clients 110a to 110i, sources 120a to 120j, central repository 130, consolidation planning system 140, and destinations 150a to 150k.

Clients 110a to 110i represent one or more clients that may access consolidation planning system 140 during the consolidation planning process. A client may be communicatively coupled to consolidation planning system 140 through one or more data communication networks including, without limitation, the Internet, or may be installed on the same network host as consolidation planning system 140, depending on the particular implementation. A client may submit requests to and receive responses from consolidation planning system 140 in order to receive support for various tasks involved in consolidation planning such as those listed above.

Sources 120a to 120j comprise a plurality of sources that are candidates for consolidation. A "source" or "consolidation source", as used herein, refers to a set of one or more software resources, hardware resources, or some combination thereof that may be consolidated. Example sources may include, without limitation: an application running on a server, a physical server that hosts one or more applications, a virtual server that hosts one or more applications, and/or one or more database system components (e.g., a database instance, a database server, a physical database, etc.).

Central repository 130 stores a set of metric data for sources 120a to 120j. The metric data for sources 120a to 120j may generally comprise data that identifies performance attributes associated with sources 120a to 120j, which may be used to identify potential conflicts and to predict post-consolidation performance as described in further detail below. Example performance data that may be stored may include, without limitation, database object usage statistics, input/output (I/O) operation statistics, wait time statistics, database session statistics, operating system statistics, and/or other resource usage metrics.

Consolidation planning system 140 provides clients 110a to 110i with access to a set of one or more applications or other services for performing consolidation planning operations, as described in further detail herein. Consolidation planning system may generally comprise control console 141, collection services 142, planning services 143, recommendation services 144, and data repository 145.

Control console 141 includes a user interface that allows a user to monitor and administer consolidation planning locally and/or from a network location. The user interface may comprise, without limitation, a graphical user interface (GUI), an application programming interface (API), a command-line interface (CLI) or some other means of interacting with a user. A "user" in this context may include, without limitation, an application or a human user such as a system administrator.

Collection services 142 collects metric data from sources 120a to 120j, central repository 130, and/or destinations 150a to 150k for use during consolidation planning. In some embodiments, collection services 142 may collect the metric data by issuing diagnostic queries to the target sources or destinations. Example diagnostic queries may include, without limitation, Simple Network Management Protocol (SNMP) queries, Automatic Workload Repository (AWR) queries, and Structured Query Language (SQL) queries.

Planning services 143 generates consolidation planning data from a set of parameter values received from the user. The consolidation planning data may include, without limitation, consolidation scenarios or "plans" for mapping at least a subset of sources 120a to 120j to destinations 150a to 150k.

Recommendation services 144 determines what recommendations, if any, to provide during the consolidation planning process. Recommendation services 144 may receive the parameter values and respective consolidation planning data at various stages of the consolidation planning process to tailor the recommendations that are generated at different stages of the planning process for different consolidation scenarios and/or sources.

Data repository 145 stores a set of data that is used by consolidation planning system 140 during the consolidation planning process. Example data that may be stored include, without limitation, metric data collected by collection services 142, planning data generated by planning services 143, and recommendation data generated by recommendation services 144.

Destinations 150a to 150k represent a set of one or more destinations for consolidating sources 120a to 120j. A "destination" or "consolidation destination", as used herein, refers to a set of one or more software resources, hardware resources, or some combination thereof onto which the sources may be consolidated. Destinations may be actual, existing destinations that are ready to use for consolidation, "phantom" destinations that have not been purchased or otherwise provisioned for consolidation, or some combination thereof. By providing support for phantom destinations, a user may analyze various possible consolidation scenarios before acquiring a destination system. Thus, the consolidation planning process may help guide a user's decision on which destination systems to purchase or otherwise acquire.

Consolidation Planning

As noted above, consolidation planning system 140 provides support during consolidation planning operations. A consolidation planning operation is a process whereby a set of one or more consolidation scenarios for consolidating a plurality of sources are defined or otherwise generated. The consolidation planning operation may analyze various scenario parameters and/or other associated data to suggest possible source-to-destination mappings that are in-line with a given consolidation scenario and other recommendations for improving post-consolidation performance.

The consolidation scenarios that are defined during the planning operation may vary from implementation to implementation. In some embodiments, sources database systems may be consolidated to destination servers. When consolidating source database systems to destination servers, the number of databases may not change upon consolidation, although the number of database servers is typically reduced. In other embodiments, sources may be consolidated to destination databases. In this scenario, the number of databases and database servers is typically reduced. Consolidating to a destination database may comprise, without limitation, consolidating multiple databases as different pluggable databases in a multi-tenant container database and/or consolidating the schemas of multiple source databases by exporting schemas from the source databases and importing the schemas to a non-container database.

During a consolidation planning operation, consolidation planning system 140 may receive parameter values that define constraints and other characteristics for performing consolidation of a plurality of sources. Parameter values may be received at different stages of the consolidation planning process. At the outset, for example, the user may input source candidate identification data that identifies a plurality of source candidates for consolidation. As the process continues, the user may input constraints or other details to define, modify, and/or analyze different consolidation scenarios.

Figure 2:
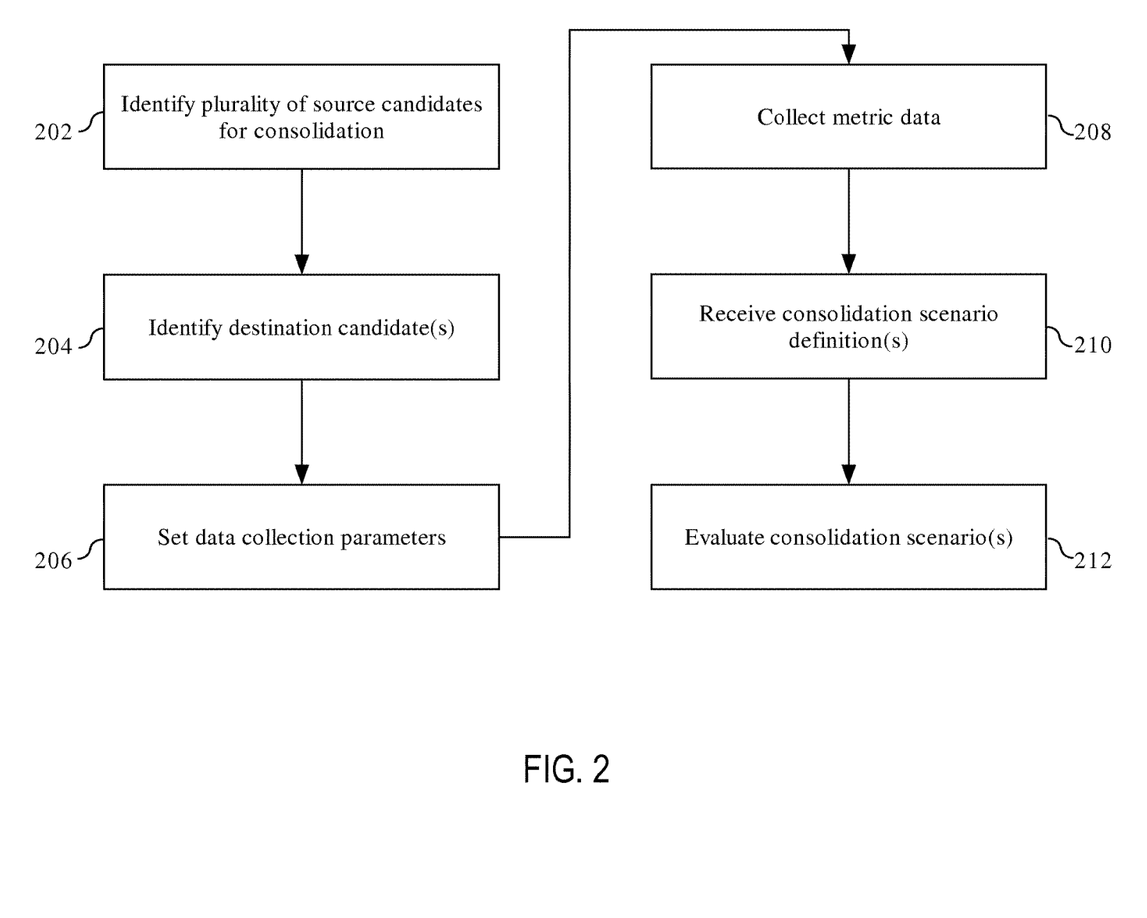
FIG. 2 is a flowchart depicting an example process for performing a consolidation planning operation for a proposed consolidation of a plurality of sources, according to an embodiment.

FIG. 2 is a flowchart depicting an example process for performing a consolidating planning operation for a proposed consolidation of a plurality of sources, according to an embodiment. In step 202, source candidate identification data is received that identifies a plurality of source candidates for consolidation. The source candidate identification data for a given source candidate may comprise any data that specifically identifies the source candidate. Example source candidate identification data may include, without limitation a label such as a hostname and/or a network address such as an Internet Protocol (IP) address and/or a database name or connect string that is assigned to the source candidate.

In step 204, destination candidate identification data is received that identifies a set of one or more destination candidates onto which the plurality of source candidates may be consolidated. The destination candidates may include existing destinations and/or phantom destinations. For existing destination candidates, the identification data may comprise data similar to the source candidate identification data, such as a hostname and IP address for a corresponding candidate. For phantom destinations, the user may select a specific engineered system or define a custom generic system as described in further detail below.

In step 206, data collection parameters are set for the plurality of sources. The data collection parameter values may specify, without limitation, a minimum number of days to collect data from the source candidates, a maximum number of days to collect data from the source candidates, and/or a time at which to begin the data collection process.

In step 208, metric data is collected for the plurality of sources based on the data collection parameters. In some embodiments, the metric data is collected by periodically or continuously issuing diagnostic queries to the source candidates and/or central repository over a period of time specified in the data collection parameters. In other embodiments, the metric data may be collected from existing historical data that was collected prior to beginning the consolidation planning operation. In some embodiments, this step may further comprise collecting metric data for the destination candidates. The metric data may be collected directly from existing destination candidates or determined from an internal library that maintains benchmark information. During or after metric collection at this step, rules that apply to individual sources may be evaluated, as described in further detail below, to generate corresponding recommendations. For example, some rules may be applied to identify performance bottlenecks in source databases that should be addressed prior to defining consolidation scenarios. As another example, some rules may calculate resource requirements or characterize the workload of a corresponding source database.

In step 210, one or more consolidation scenarios are defined for the consolidation planning operation. A consolidation scenario may correspond to a consolidation of all or a subset of the source candidates onto all or a subset of the destination candidates and may be generated based on a set of scenario parameters. Example scenario parameters are described in further detail below. The consolidation scenarios may be custom-generated by a user and/or automatically generated based on a set of predefined parameter values, depending on the particular implementation.

In step 212, the set of one or more consolidation scenarios are evaluated to generate a suggested source-to-destination mapping and/or a set of one or more other recommendations for each consolidation scenario. The source-to-destination mapping may be generated by determining which sources for a given consolidation scenario fit onto a destination as tightly as possible, minimizing resource waste and meeting performance thresholds, while satisfying the constraints of the consolidation scenario. In some embodiments, the source-to-destination mapping may be automatically generated by planning services 143. In other embodiments, a user may manually generate the source-to-destination mapping for a particular consolidation scenario. The set of recommendations, including the source-to-destination mapping, may be displayed to an end user through a GUI or some other interface (e.g., through control console 141).

After step 212 is performed, the user may alter the consolidation scenarios, generate new consolidation scenarios, and/or reevaluate existing consolidation scenarios using updated metric data. Thus, the user may continue the consolidation planning process until optimal scenario(s) for the user's situation are identified.

Scenario Parameters

A consolidation scenario may be defined through a set of constraints and/or other scenario parameters. The parameters that are used to define a consolidation may vary from implementation to implementation and from scenario to scenario. Example parameter values may include, without limitation:

Consolidation aggressiveness;
Collection parameter constraints;
Constraints on the sources that are consolidated; and/or
Constraints on the destinations to which sources are consolidated.

The parameter values and constraints may be defined on an individual consolidation scenario basis, for groups of consolidation scenarios, and/or on a global basis for all consolidation scenarios, depending on the particular implementation. A description of the example parameters listed above is provided herein.

A consolidation aggressiveness parameter value may be associated with a consolidation scenario to indicate how aggressively or conservatively to consolidate sources. This parameter value may affect how many sources are fit onto each destination. A more aggressive consolidation scenario typically results in a higher consolidation ratio with a greater number of sources being consolidated to a single destination than a more conservative approach. For example, the most conservative consolidation scenario may consolidate sources based on the peak usage rates of each source as indicated by the metric data. As the consolidation scenarios become more aggressive, the percentile usage rates that are used to consolidate sources may decrease (e.g., a percentile less than the peak usage rate may be considered when determining which sources fit on a destination). In the most aggressive consolidation scenario, sources may be consolidated based on average per-hour usage rates, with peak usage times in one source matched up with low usage times in another to maximize destination utilization.

Collection parameter constraints may be defined to restrict which metric data is considered to generate recommendations for a given consolidation scenario. For example, the user may specify that a subset of the metric data collected should be used to generate a recommended source-to-destination mapping while collected metric data outside the subset is not used to generate the mapping. The metric data that is used may be restricted based on time (e.g., use only data collected more recent than a certain threshold), based on type (e.g., ignore database I/O usage) and/or based on location (e.g., use metric data collected from individual source's AWR but not other repositories).

Scenario parameters may define source constraints to indicate how sources should be consolidated for a particular consolidation scenario. For example, a source constraint may indicate that only a subset of the source candidates should be consolidated for a particular consolidation scenario. When evaluating the consolidation scenario, source candidates within the subset are analyzed for consolidation while source candidates outside the subset are not. The source-to-destination mapping may exclude mappings for those source candidates that are not a part of the subset.

Source constraints may also indicate source compatibility criteria. Source compatibility criteria may be used to define compatible sources and/or mutually exclusive sources. In some embodiments, a constraint may define whether sources are compatible based on whether they share certain characteristics. Example source characteristics that may be considered include, without limitation, lifecycle status, department, location, network domain, vendor information, and/or system configurations. For instance, constraints may be defined such that specific sources remain within a certain location after consolidation. In such a scenario, sources from different locations may not be consolidated to a particular destination, regardless of how well they fit on a particular destination. In another example, nodes of a clustered database may have a mutually exclusive constraint defined such that the nodes are not consolidated to a single destination server. In yet another example, sources with different operational characteristics, such as I/O usage profiles or workload characterization, may be consolidated to different destination systems in order to maximize performance.

Scenario parameters may define constraints on target destinations for a particular consolidation scenario. In some embodiments, destination constraints may be expressed as a percentage of resource utilization that can maximally be used on a destination server post-consolidation. For example, the constraint may indicate a maximum percentage of central processing unit (CPU) and/or memory resources that sources consolidated to the destination should use. In other embodiments, destination constraints may be expressed in terms of destination characteristics. For example, the user may specify a minimum storage capacity for a destination server used in a consolidation scenario or the user may select the particular destination system for use during consolidation.

Based on the scenario parameters, multiple consolidation scenarios may be defined and analyzed. For example, one consolidation scenario may follow an aggressive consolidation strategy while another consolidation scenario may follow a conservative consolidation strategy. Both consolidation scenarios may be evaluated to generate different respective sets of recommendations. Similarly, the user may vary other scenario parameters to analyze a plurality of different consolidation scenarios for consolidating a plurality of source candidates.

Phantom Destinations

Phantom destinations may be selected as a destination by a user or recommended as a destination by recommendation services 144. In some embodiments, the phantom destination may be a generic system that is defined in terms of resource characteristics. For example, a generic system may be defined in terms of CPU capacity, memory availability, storage capacity, and/or IOPs capacity.

In some embodiments, the phantom destination may be an available engineered system. To identify available engineered systems, consolidation planning system 140 may maintain an internal library with capacity information from the data sheets of several currently available engineered systems. The internal library may also maintain multiple CPU performance benchmark values published for a large number of systems from different vendors for multiple benchmarks. Consolidation may use this stored information to determine the resource capacities of available engineered systems as well as existing destinations.

Consolidation Recommendations

Recommendation services 144 may generate recommendations for improving post-consolidation performance, according to an embodiment. Recommendations may be associated with a particular source and/or a particular consolidation scenario, depending on the particular recommendation being generated. Example recommendations that may be generated to help improve post-consolidation performance may include, without limitation:

Recommendations relating to conflicts that may affect consolidation planning and/or consolidation;

Recommendations relating to resource capacity on the set of destination systems;

Recommendations relating to mapping sources to destinations;

Recommendations to use specific destination systems during consolidation; and/or Recommendations to compress data using specific compression types as part of the consolidation operation.

Various conflicts may negatively impact consolidation planning and post-consolidation performance. In one example, a user may attempt to consolidate mutually exclusive or otherwise incompatible sources onto a single target destination. Recommendation services 144 may detect such conflicts and alert the user such that the issue may be resolved prior to proceeding further with consolidation planning.

In some embodiments, recommendation services 144 may analyze a set of parameter values associated with a consolidation scenario to display recommended resource capacities for a particular destination. For example, recommendation services 144 may determine that an existing destination target has a half rack of storage. Based on an analysis of post-consolidation resource utilization, recommendation services 144 may recommend upgrading the destination target to a full rack of storage. As another example, recommendation services 144 may recommend that a generic, phantom destination system support a minimum IOPS rate and/or a minimum CPU rate.

In some embodiments, recommendation services 144 may affect the source-to-mapping data that is generated by planning services 143. For example, recommendation services may prevent policy-managed database from being mapped to the same destination as an administrator-managed database. As another example, recommendation services may prevent a cluster database from mapping onto the same destination as a non-cluster database. In yet another example, recommendation services 144 may recommend an alternate mapping to one that has been manually generated for a consolidation scenario.

In some embodiments, recommendation services 144 may generate recommendations to use specific destination systems for consolidation. Certain destination systems are specially-engineered for certain applications. For example, Exadata systems are database appliances designed to support both online transaction processing (OLTP) and decision support system (DSS) workloads. In a mixed workload environment, recommendation services 144 may recommend Exadata as a possible solution for consolidating a plurality of sources. Similarly other engineered systems may be recommended based on the consolidation planning parameters.

In some embodiments, the recommendations may interrupt the consolidation planning process to notify the user of potential issues that may affect a proposed consolidation. For example, the user may begin a consolidation planning process by selecting source candidate destinations for a proposed consolidation. In response to detecting a bottleneck in one of the source candidate destinations, the process may be interrupted with a notification message identifying the bottleneck and recommending database tuning before proceeding. Similarly, other recommendations may be displayed as the user inputs other parameters for a proposed consolidation.

The recommendations that are generated may be explicit, implicit, or some combination thereof. An explicit recommendation may clearly identify a suggested course of action to take during consolidation or consolidation planning. By contrast, an implicit recommendation may imply a course of action should be taken during consolidation or consolidation planning without explicitly identifying what the course of action should be. In the context of a detected conflict, for example, an explicit recommendation may specify how to resolve the conflict whereas an implicit recommendation may simply be a flag that identifies the conflict. Thus, a recommendation may be any notification relating to issues identified for a proposed consolidation (e.g., issues pertaining to a consolidation source, consolidation scenario, etc.).

The recommendations that are generated may be based on a variety of parameters. Example parameters may include, without limitation, scenario parameters, metric data, other recommendations, and/or some combination thereof. The parameters may be input into a rule engine in order to generate the recommendations as described in further detail below.

Workload Analysis

As noted above, recommendation services 144 may generate recommendations based, at least in part, on an analysis of source workload characteristics. The workload characteristics may be extracted from metric data collected for the sources over a period of time. The workload characteristics that are analyzed may vary from implementation to implementation and from recommendation to recommendation. Example workload characteristics that are analyzed may correspond to the metric data that is collected and may include, without limitation, database memory and processor (CPU) usage statistics, input/output (I/O) operation statistics, wait time statistics, database session statistics, operating system statistics, and/or other resource usage metrics. By analyzing such metrics, post-consolidation performance may be predicted and corresponding recommendations generated.

In some embodiments, the workload characteristics of source candidates may be analyzed to determine whether a resource bottleneck exists at the source. In the context of a database consolidation, for example, an average synchronous single-block read latency that is above a threshold may indicate an I/O bottleneck at the source. In response to detecting that the read latency is above a threshold, recommendation services 144 may generate a warning or other recommendation data to alert a user. Similarly, other workload statistics may be analyzed and compared to thresholds to detect potential bottlenecks and generate corresponding warnings.

In some embodiments, workload characteristics may affect recommended source-to-destination mappings. Based on the metric data collected for the sources, the average and/or peak resource usage rates may be calculated for each source in a consolidation scenario. Depending on consolidation aggressiveness and/or other constraints for the consolidation scenario, a recommended mapping may be determined by matching the resource utilization for each source against available capacity at a destination. Furthermore, certain combinations of sources for consolidation to a particular destination may be determined and recommended to maximize post-consolidation performance. For example, different combinations of sources on a destination may be analyzed to determine the combination that yields the tightest fit while meeting the constraints of a consolidation scenario.

In some embodiments, the workload of the source candidates may be classified during the consolidation process to generate a set of one or more recommendations. Based on an analysis of the metric data, consolidation planning system 140 may determine whether the workload at a source is transactional (OLTP), analytical (DSS), or mixed. For example, the input output statistics of a source may be analyzed to determine the average number of transactional hours versus analytical hours. If the percentage is above a first threshold (e.g. greater than 60%), then the source may be classified as transactional. If the number is between the first threshold and a second threshold (e.g., between 40% and 60%), then the source may be classified as mixed. If the number is below the second threshold (e.g., less than 40%), then the source may be classified as analytical. The classification may be used to generate a set of one or more recommendations including, without limitation, recommending a particular destination system that is engineered to handle the type of workload at the source.

Rule-Based Engine

In some embodiments, a rule-based engine provides recommendations by evaluating consolidation rules based on input values from various sources. Rules may be used to provide various recommendations including, without limitation, identifying potential bottlenecks in sources, characterizing workload of sources, determining recommended destination capacity based on source characteristics and consolidation scenario parameters, and/or predicting performance of the consolidated sources.

Figure 3:
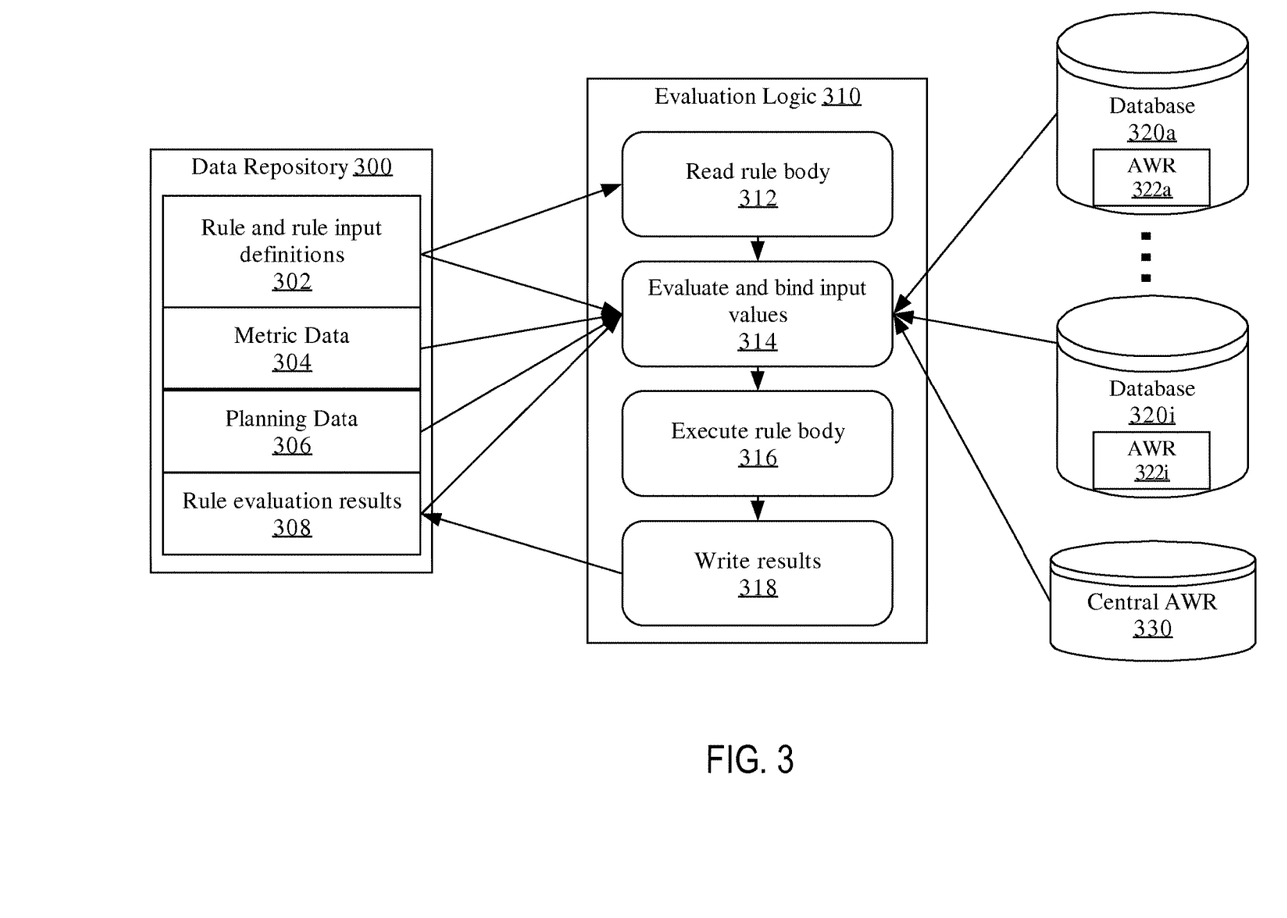
FIG. 3 is a block diagram depicting example processing by a rule-based engine that may process rules to generate recommendations during a consolidation planning operation, according to an embodiment.

FIG. 3 is a block diagram depicting example processing by a rule-based engine that may process rules to generate recommendations during a consolidation planning operation, according to an embodiment. Rule-based engine generally comprises data repository 300 and rule evaluation logic 310.

Data repository 300 stores data that is used by rule evaluation logic 310 during rule evaluation. The data may generally comprise, without limitation, rule and rule input definitions 302, metric data 304, planning data 306, and/or rule evaluation results 308.

Rule and rule input definitions 302 stores a set of one or more rules that may be evaluated by rule evaluation logic 310 to generate an evaluation result. As used herein, a "rule" refers to stored logic, such as stored instructions, for generating an evaluation result using a set of one or more inputs associated with a consolidation operation. The set of rules that are stored may vary from implementation to implementation and may be extensible by an end user to capture custom logic. For example, rule bodies may be defined using PL/SQL, Java, or using some other programmable interface.

Metric data 304 comprises a set of one or more metrics collected from databases 320a to 320i and/or central AWR 330, such as the metric data described above. Metric data 304 may be used by rule evaluation logic 310 to generate recommendations based on workload characteristics of a source. For example, rule and rule input definitions 302 may be evaluated against metric data 304 to alert the user about potential bottlenecks, determine source-to-destination mappings, and/or recommend specific destination systems.

Planning data 306 stores parameter values including scenario parameters that are received during the consolidation planning process. Rule evaluation logic 310 may evaluate rules against such planning data to generate corresponding recommendations. For example, rule evaluation logic may generate a recommendation based, at least in part, on how aggressive a particular consolidation scenario is.

Rule-evaluation results 308 stores evaluation results generated by rule evaluation logic 310. As used herein, an "evaluation result" refers to data that is generated in response to evaluating a rule using a set of one or more inputs associated with a consolidation operation. The evaluation result for one rule may be used as input when evaluating another rule. For example, a first rule may characterize the workload type of a source. A second rule may receive the workload type for the source to determine a consolidation recommendation to generate. The format of the rule evaluation result may vary from implementation to implementation. Example data that may be stored in a rule evaluation result may include, without limitation, an identity of the rule executed, an identity of a target (e.g., a particular source, consolidation scenario, etc.) to which the result pertains, result data (e.g., numeric result data, character strings comprising recommendation messages, image data for displaying the result etc.) of the rule execution, an evaluation status (no problems identified by rule, rule detected issue to include in user alert/recommendation), and a time of evaluation. In some embodiments, the evaluation status of a rule may be subdivided into different categories based on urgency or some other criteria. For example, a rule evaluation result may be classified as informational, severe, etc.

Blocks 312 to 318 depict an example process implemented by evaluation logic 310 for evaluating rules. In block 312, evaluation logic 310 reads a rule body and one or more input definitions from data repository 300. In some embodiments, a client may pass a target identifier for a source database if the rule collects AWR data from one of databases 320a to 320i.

In block 314, evaluation logic 310 evaluates and binds input values based on the input definition for the rule. During this step, evaluation logic 310 may read input definitions for the rule in order of position. The inputs may be retrieved from a variety of sources, as dictated by the rule input definition, including, without limitation, metric data 304, planning data 306, rule evaluation results 308, AWR 322a to 322i, and/or central AWR 330. For each input, rule evaluation logic 310 may a) select a connection for obtaining the input value(s) based on the input source; b) generate an input query for obtaining the input value(s), c) execute the input query to retrieve the input value(s); and/or d) bind the returned input value(s) to the rule body placeholder at an appropriate position.

After binding the input values to the rule body, rule evaluation logic 310 executes the rule body in block 316. Executing the rule body generates an evaluation result for the rule. The evaluation result may comprise recommendation data in any suitable format. For example, the recommendation may comprise message data for conveying a recommendation message to a user and/or image data for causing display of the recommendation.

In block 318, rule evaluation logic 310 write the evaluation results to repository 300. The evaluation result written at this step may be used to generate/display consolidation recommendations and/or may be used as input for another rule. The recommendations that are generated may be associated with a particular source database or consolidation scenario depending on particular rule being executed.

Rule Format

The format of the rules and rule input definitions may vary from implementation to implementation. In some embodiments, the rule definitions may include, without limitation:

A name and/or other identification data to uniquely identify the rule;
A rule type that identifies the context in which the rule is used;
A rule body that stores the logic of the rule; and/or
A set of rule input definitions.

The rule type may define different classes of rules including, without limitation, source analysis rules, consolidation analysis rules, and/or source consolidation analysis rules. Source analysis rules comprise rules that analyze a single source database prior to consolidation analysis. For example, these rules may be used to detect bottlenecks in source candidates before consolidation scenarios are defined during a consolidation planning operation. These rules may be executed early on in the consolidation planning process to detect issues that may affect consolidation analysis before the analysis occurs. Consolidation analysis rules comprise rules that run in the context of a consolidation scenario including rules that consider sets of source databases and rules that access scenario destination specifications. These rules may be executed after consolidation scenarios have been defined and may provide recommendations on how to improve particular scenarios. A subtype of the consolidation analysis rules are source consolidation analysis rules which describe rules that evaluate a single source database in the context of a consolidation scenario.

The rule body may be defined using logic that may be executed by evaluation logic 310. In some embodiments, the rule body is a PL/SQL block including defined input and output parameters. PL/SQL is widely used by system administrators and highly extensible, facilitating customizability of the rule sets. In other embodiments, the rule body may be some other type of code that may be evaluated at runtime such as Java.

The rule input definitions may include, without limitation:
A name or other identification data that uniquely identifies the input within a rule;
A position of the input in the rule body;

A source for the input (e.g., AWR, Enterprise Manager Metrics, other rules, consolidation scenario parameters, client input, etc.);

A query used to fetch the input value(s) from the source;

The cardinality of the input (e.g., single scalar value, ordered sequence, unordered sequence); and/or A data type for the input value(s).

In some embodiments, there may be multiple definitions of a rule, with each definition drawing from a different source. For example, a first definition of a rule may be defined to retrieve input values from one of AWR 322*a* to 322*i*. A second definition of the rule may then be defined to fetch data from repository 300. Multiple definitions allow flexibility in the event that a source is unavailable or has insufficient performance data available.

In some embodiments, rule evaluation logic 310 may be run in different modes to determine where to fetch the input values. For example, a central AWR mode may be defined. When running in this mode evaluation logic 310 fetches AWR input values from central AWR 330 rather than source databases 320*a* to 320*i*. The same input query for a rule may be used in central AWR mode as when not running in central AWR mode with an additional qualification to identify the database within central AWR 330. When evaluation logic 310 is not running in this mode, AWR input values may be retrieved from the AWR of the appropriate source database(s).

Example Rule Sets

The rules evaluated by rule engine may be used to alert the user of relevant findings during consolidation and to recommend actions to improve post-consolidation performance. FIGS. 4A-4C are tables depicting example rule sets that may be evaluated to generate recommendations with respect to consolidating a plurality of sources, according to an embodiment. The table includes a rule number column for identifying each respective rule, input column 402 for depicting the inputs of the corresponding rule, logic column 404 for describing the logic implemented by the rule, and system action column 406 for depicting the resulting recommendations generated in response to executing the rule.

Referring to FIG. 4A, rule 412 characterizes the workload type of a source by comparing the I/O workload measured in megabytes per second and IOPS to a set of thresholds. In response to executing the rule, the estimated workload type of the corresponding source database is displayed. Rules 414 to 420 compare various source metrics against thresholds, which may be abstracted out and configurable, to determine whether there are any bottlenecks at the source. If a bottleneck is detected, a warning message may be generated and displayed.

Referring to FIG. 4B, rules 422, 424, and 426 recommend Exadata machines for consolidation based on an analysis of various workload characteristics of the consolidated sources. Rule 428 displays a recommended IOPS for a destination based on the desired redundancy and the read and write IOPS of the consolidated sources. Rule 430 checks for violations of a mutually exclusive constraint.

Referring to FIG. 4C, rule 432 informs the user of the estimated storage savings resulting from the type of compression specified in the scenario. Rule 434 recommends selecting a different storage configuration in order to reduce the number of storage units required.

The user may add, delete, and/or otherwise modify (e.g., configure threshold values) the rules depicted in FIG. 4A-4C. The rules that are defined may generally check source metrics, configurations, initialization parameter values, etc. against certain thresholds. The rules may help make consolidation planning more rigorous and less error prone while allowing flexibility to accommodate changes in domain logic.

Rule Set Identification and Evaluation

The rule sets that are evaluated during a particular consolidation planning operation may be determined based on a variety of factors. In some embodiments, the clients/users that are performing a consolidation planning operation may specify which rules to evaluate. In other embodiments, rules may be filtered by rule type, scenario parameters, and/or workload characteristics of the source. In other embodiments, all of the rules may be evaluated during a consolidation planning operation.

Rule sets may be executed at different stages of a consolidation planning operation. For example, the rule evaluation engine may execute source analysis rules for the source database candidates defined in a consolidation project prior to creating any scenarios in order to report problems that should be cleaned up prior to consolidation. The rule evaluation may execute consolidation analysis rules (including source consolidation analysis rules) once the consolidation scenario has been defined and prior to analysis of the consolidation scenario. In other embodiments, source analysis rules may be executed for an arbitrary set of sources by applications other than the database consolidation application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
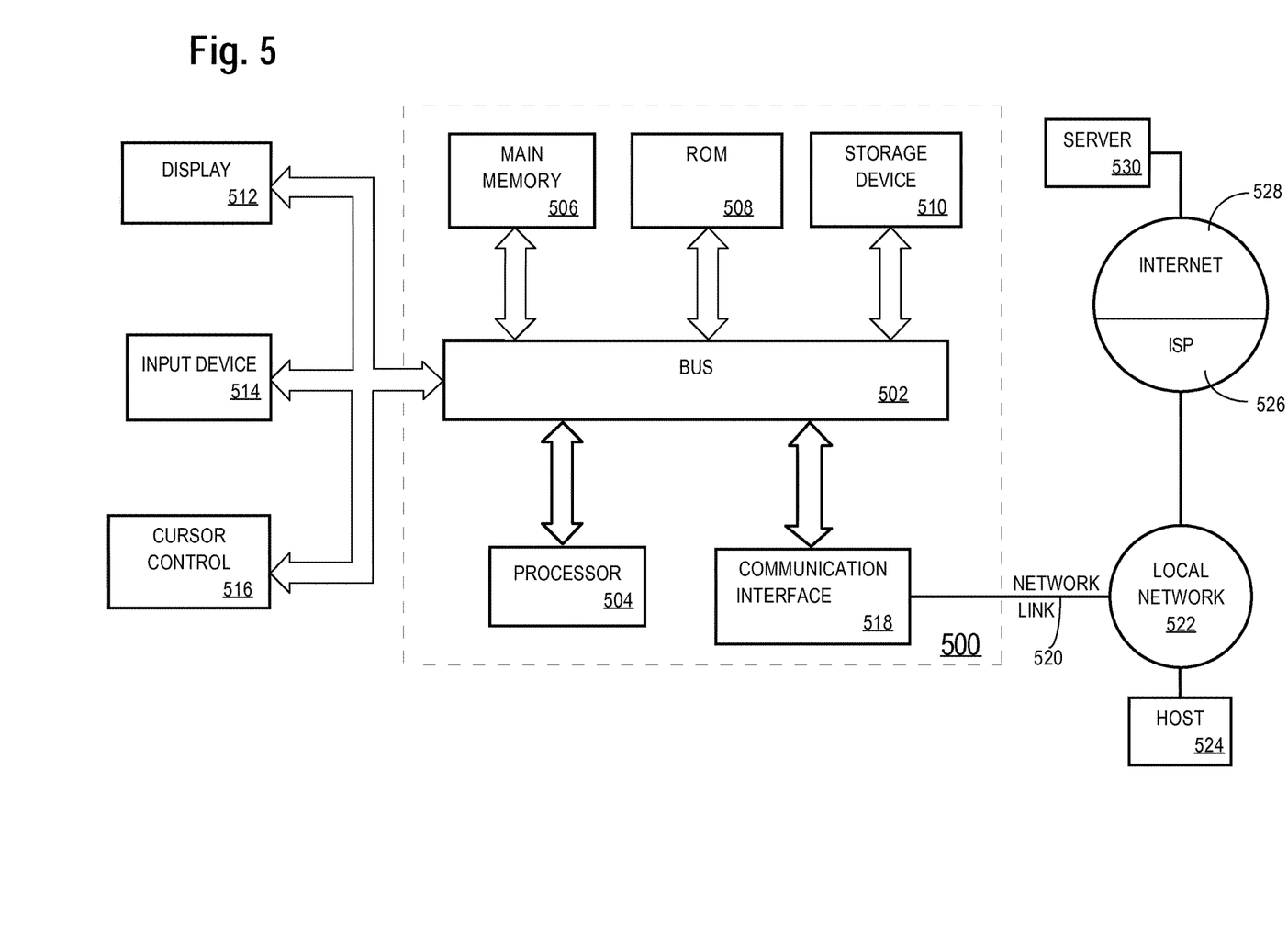
FIG. 5 is a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a liquid-crystal display (LCD) or a light-emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing Overview

The techniques described herein are implemented using one or more processing solutions, examples of which include distributed systems, clustered computing systems, and cloud computing systems. In an embodiment, consolidation planning system 140 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to consolidation planning system 140, or to other entities within this description, is controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for providing automated advice with respect to consolidating a plurality of consolidation sources, the method comprising:
receiving a set of one or more parameters that defines constraints or characteristics of a proposed consolidation for the plurality of consolidation sources, wherein at least one parameter of the set of one or more parameter indicates a consolidation ratio, wherein a higher consolidation ratio indicates to consolidate said plurality of consolidation sources to a lesser number of consolidation destinations;
in response to receiving the set of one or more parameters evaluating a set of rules based, at least in part, on a set of input data associated with the plurality of consolidation sources and the set of one or more parameters;
wherein one or more rules of the set of rules comprise a respective rule input definition that specifies at least one input source, wherein the at least one input source comprises at least database user session metrics or database object usage statistics;
in response to evaluating the set of rules, generating a set of evaluation results that identify a set of one or more recommendations, each recommendation of said set of one or more recommendations recommending how to consolidate the plurality of consolidation sources;
wherein each rule in the set of rules generates at least one evaluation result;
storing, on at least one of a volatile or non-volatile computer-readable storage medium, the evaluation results; and
wherein the method is performed by one or more computing devices.

2. The method of claim 1,
wherein the set of one or more parameters is associated with a particular consolidation scenario and identifies a set of constraints that limit the plurality of consolidation sources to a set of one or more destinations;
wherein the set of one or more recommendations is generated based, at least in part, on the set of constraints.

3. The method of claim 1, wherein the set of one or more recommendations includes at least one recommendation to improve a performance associated with the proposed consolidation.

4. The method of claim 3, wherein the at least one recommendation includes one or more of a recommendation to resolve a conflict associated with at least one of the plurality of consolidation sources, a recommendation on how to improve a projected post-consolidation performance of a particular consolidation scenario, a recommendation to use a particular destination system for a set of one or more destinations when performing a consolidation operation, or a recommendation of an alternative consolidation scenario.

5. The method of claim 1, wherein generating the set of one or more recommendations is based, at least in part, on workload characteristics associated with the plurality of consolidation sources.

6. The method of claim 1, further comprising causing display of the set of one or more recommendations during consolidation planning for the plurality of consolidation sources.

7. The method of claim 1, further comprising in response to receiving an evaluation result relating to the proposed consolidation, interrupting a consolidation planning operation by causing display of at least one recommendation from the set of one or more recommendations.

8. A method for providing automated advice with respect to database consolidation, the method comprising:
receiving input that identifies a plurality of consolidation sources, said plurality of consolidation sources including a plurality of database system components;
determining a set of one or more workload characteristics for each respective consolidation source of the plurality of consolidation sources, wherein determining a set of one or more workload characteristics includes, for a particular consolidation source of said plurality of consolidation sources, collecting metric data generated by a database server, said metric data including database object usage statistics or database user session metrics;
generating a set of one or more recommendations, each recommendation of said set of one or more recommendations recommending how to consolidate the plurality of consolidation sources, based, at least in part, on the set of one or more workload characteristics for each respective consolidation source of the plurality of consolidation sources;
wherein the set of one or more recommendations includes a recommendation recommending to consolidate at least a subset of the plurality of consolidation sources within one or more database system components based on the metric data generated by the database server;
storing, on at least one of a volatile or non-volatile computer-readable storage medium, the set of one or more recommendations;
wherein the method is performed by one or more computing devices.

9. The method of claim 8, wherein determining the set of one or more workload characteristics for each consolidation source of the plurality of consolidation sources comprises:
collecting metric data over a period of time for each respective consolidation source of the plurality of consolidation sources;
determining, based on the metric data, a projected resource utilization for each respective consolidation source of the plurality of consolidation sources.

10. The method of claim 9, wherein the set of one or more recommendations includes at least one recommendation based at least in part on the projected resource utilization for each respective consolidation source of the plurality of consolidation sources.

11. The method of claim 8,
wherein the set of one or more workload characteristics identifies a workload type for each respective consolidation source of the plurality of consolidation sources;
wherein the set of one or more recommendations includes at least one recommendation based, at least in part, on the workload type for each consolidation source of the plurality of consolidation sources.

12. The method of claim 8, wherein generating the set of one or more recommendations is based, at least in part, on the set of one or more workload characteristics for each respective consolidation source of the plurality of consolidation sources comprises:
determining a particular combination of at least a subset of consolidation sources on a particular consolidation destination that improves post-consolidation performance;
generating a recommendation that identifies the particular combination.

13. The method of claim 8, wherein the set of one or more recommendations includes a recommendation to tune at least one consolidation source of the plurality of consolidation sources before continuing with consolidation planning.

14. One or more non-transitory computer-readable media storing instructions for providing automated advice with respect to consolidating a plurality of consolidation sources, the instructions, when executed by one or more processors, causing operations comprising:
    receiving a set of one or more parameters relating to that defines constraints or characteristics of a proposed consolidation for the plurality of consolidation sources, evaluating a set of rules based, at least in part, on a set of input data associated with the plurality of consolidation sources and the set of one or more parameters, wherein at least one parameter of the set of one or more parameter indicates a consolidation ratio, wherein a higher consolidation ratio indicates to consolidate said plurality of consolidation sources to a lesser number of consolidation destinations;
    wherein one or more rules of the set of rules comprise a respective rule input definition that specifies at least one input source, wherein the at least one input source comprises at least database user session metrics or database object usage statistics;
    in response to evaluating the set of rules, generating a set of evaluation results that identify a set of one or more recommendations, each recommendation of said set of one or more recommendations recommending how to consolidate the plurality of consolidation sources;
    wherein each rule in the set of rules generates at least one evaluation result; and
    storing, on at least one of a volatile or non-volatile computer-readable storage medium, the evaluation results.

15. The one or more non-transitory computer-readable media of claim 14,
    wherein the set of one or more parameters is associated with a particular consolidation scenario and identifies a set of constraints that limit the plurality of consolidation sources to a set of one or more destinations,
    wherein the set of one or more recommendations is generated based, at least in part, on the set of constraints.

16. The one or more non-transitory computer-readable media of claim 14, wherein the set of one or more recommendations includes at least one recommendation to improve a performance associated with the proposed consolidation.

17. The one or more non-transitory computer-readable media of claim 16, wherein the at least one recommendation includes one or more of a recommendation to resolve a conflict associated with at least one of the plurality of consolidation sources, a recommendation on how to improve a projected post-consolidation performance of a particular consolidation scenario, a recommendation to use a particular destination system for a set of one or more destinations when performing a consolidation operation, or a recommendation of an alternative consolidation scenario.

18. The one or more non-transitory computer-readable media of claim 14, wherein generating the set of one or more recommendations is based, at least in part, on workload characteristics associated with the plurality of consolidation sources.

19. The one or more non-transitory computer-readable media of claim 14, wherein the instructions further cause operations comprising: causing display of the set of one or more recommendations during consolidation planning for the plurality of consolidation sources.

20. The one or more non-transitory computer-readable media of claim 14, wherein the instructions further cause operations comprising: in response to receiving an evaluation result relating to the proposed consolidation, interrupting a consolidation planning operation by causing display of at least one recommendation from the set of one or more recommendations.

21. One or more non-transitory computer-readable media storing instructions for providing automated advice with respect to database consolidation, the instructions, when executed by one or more processors, causing operations comprising:
    receiving input that identifies a plurality of consolidation sources, said plurality of consolidation sources including a plurality of database system components;
    determining a set of one or more workload characteristics for each respective consolidation source of the plurality of consolidation sources, wherein determining a set of one or more workload characteristics includes, for a particular consolidation source of said plurality of consolidation sources, collecting metric data generated by a database server, said metric data including database object usage statistics or database user session metrics;
    generating a set of one or more recommendations, each recommendation of said set of one or more recommendations recommending how to consolidate the plurality of consolidation sources, based, at least in part, on the set of one or more workload characteristics for each respective consolidation source of the plurality of consolidation sources;
    wherein the set of one or more recommendations includes a recommendation recommending to consolidate at least a subset of the plurality of consolidation sources within one or more database system components based on the metric data generated by the database server;
    storing, on at least one of a volatile or non-volatile computer-readable storage medium, the set of one or more recommendations.

22. The one or more non-transitory computer-readable media of claim 21, wherein instructions for determining the set of one or more workload characteristics for each consolidation source of the plurality of consolidation sources comprise instructions for:
    collecting metric data over a period of time for each respective consolidation source of the plurality of consolidation sources;
    determining, based on the metric data, a projected resource utilization for each respective consolidation source of the plurality of consolidation sources.

23. The one or more non-transitory computer-readable media of claim 22, wherein the set of one or more recommendations includes at least one recommendation based at least in part on the projected resource utilization for each respective consolidation source of the plurality of consolidation sources.

24. The one or more non-transitory computer-readable media of claim 21,
    wherein the set of one or more workload characteristics identifies a workload type for each respective consolidation source of the plurality of consolidation sources;
    wherein the set of one or more recommendations includes at least one recommendation based at least in part on the workload type for each consolidation source of the plurality of consolidation sources.

25. The one or more non-transitory computer-readable media of claim 21, wherein instructions for generating the set of one or more recommendations is based, at least in part, on the set of one or more workload characteristics for each respective consolidation source of the plurality of consolidation sources comprise instructions for:
   determining a particular combination of at least a subset of consolidation sources on a particular consolidation destination that improves post-consolidation performance;
   generating a recommendation that identifies the particular combination.

26. The one or more non-transitory computer-readable media of claim 21, wherein the set of one or more recommendations includes a recommendation to tune at least one consolidation source of the plurality of consolidation sources before continuing with consolidation planning.

* * * * *

UNITED STATES PATENT AND TRADEMARK OFFICE
CERTIFICATE OF CORRECTION

PATENT NO. : 10,007,701 B2  
APPLICATION NO. : 14/333439  
DATED : June 26, 2018  
INVENTOR(S) : Subramanian et al.

It is certified that error appears in the above-identified patent and that said Letters Patent is hereby corrected as shown below:

In the Specification

In Column 8, Line 14, delete "IOPs" and insert -- IOPS --, therefor.

Signed and Sealed this
Second Day of April, 2019

Andrei Iancu
*Director of the United States Patent and Trademark Office*